United States Patent [19]
Richards

[11] Patent Number: 5,671,992
[45] Date of Patent: Sep. 30, 1997

[54] STEREOSCOPIC DISPLAY UNIT

[75] Inventor: Angus Duncan Richards, Osborne Park, Australia

[73] Assignee: Xenotech Research Pty. Ltd., Australia

[21] Appl. No.: 535,115

[22] PCT Filed: Apr. 28, 1994

[86] PCT No.: PCT/AU94/00219

§ 371 Date: Feb. 15, 1996

§ 102(e) Date: Feb. 15, 1996

[87] PCT Pub. No.: WO94/25899

PCT Pub. Date: Nov. 10, 1994

[30] Foreign Application Priority Data

Apr. 28, 1993 [AU] Australia ................... PL 8626

[51] Int. Cl.$^6$ .................................. G03B 21/14
[52] U.S. Cl. ......................... 353/7; 353/98; 359/464
[58] Field of Search .................... 353/7, 8, 10, 30, 353/98; 359/462, 464, 465, 466, 471, 472, 473, 477, 478; 349/15

[56] References Cited

U.S. PATENT DOCUMENTS

| | | | |
|---|---|---|---|
| 4,526,439 | 7/1985 | Okoshi et al. | 353/7 |
| 4,571,041 | 2/1986 | Goodyu | 353/7 |
| 4,623,223 | 11/1986 | Kempf | 353/63 |
| 4,799,763 | 1/1989 | Davis et al. | 353/3 |
| 5,255,028 | 10/1993 | Biles | 353/7 |
| 5,508,764 | 4/1996 | Oles et al. | 353/98 |

FOREIGN PATENT DOCUMENTS

| | | |
|---|---|---|
| 0283222 | 9/1988 | European Pat. Off. . |
| 0354851 | 2/1990 | European Pat. Off. . |
| 0460873 | 12/1991 | European Pat. Off. . |
| 2677141 | 12/1992 | France . |
| 2435850 | 2/1976 | Germany . |
| 3929583 | 4/1990 | Germany . |
| 121436A | 1/1989 | Japan . |
| 121437A | 1/1989 | Japan . |
| 121435A | 1/1989 | Japan . |
| 2072874 | 10/1981 | United Kingdom . |

OTHER PUBLICATIONS

Spain, E., "Assessments of Maneuverability with the Tele-operated Vehicle (TOV)", Fourteenth Annual Symposium of the Association for Unmanned Vehicle Systems, Jul. 19–21, 1987.

*Primary Examiner*—William Dowling
*Attorney, Agent, or Firm*—Fredrikson & Byron, PA

[57] ABSTRACT

A stereoscopic display unit (10, 110) including at least two projection units (14, 16) for projecting optical signals corresponding to the left and right image fields respectively of a stereoscopic image, and an optical focusing system (18) for focusing the two image fields to at least two focus regions at a viewing position outside of the display unit (10, 110). The left and right image fields are each respectively focused into the respective eyes of at least one viewer (72) when located at said viewing position. The optical focusing system (18) includes at least one retroreflective mirror (64, 210) and a semi-reflective mirror (66) disposed at an angle to the at least one retroreflective mirror (64, 210), the semi-reflective mirror (66) being partially reflective and partially transmissive, the optical signal being reflected between the at least one retroreflective mirror (64, 210) and the semi-reflective mirror (66) and to said viewing position.

20 Claims, 5 Drawing Sheets

STEREOSCOPIC DISPLAY UNIT

The present invention relates generally to systems for providing a 3 dimensional visual effect in a viewed image, and in particular to a stereoscopic display unit.

A number of systems are known for providing three dimensional visual effects in a viewed image. Many of these systems require the use of polarised glasses to produce the desired "3-D" effect in the viewed image. However, because of the general inconvenience in requiring special glasses to view such images, attempts have been made to develop systems which do not require such glasses.

Such systems have incorporated components such as passive and dynamic grids, lenticular lenses, and mirror arrays to produce the 3-D effect in an image which can be viewed with the naked eye. However, common problems associated with these systems include flickering unclear images, low image brightness, and the need for the viewer to be accurately positioned to receive the image.

For example, in Australian Patent 636228 (Thorn EMI PLC) there is disclosed a 3-D viewing apparatus in which light from a single cathode ray tube, or light reflected from an object, is passed through an arrangement of retroreflectors and a beam splitter to produce a real image suspended in space for viewing as an apparent 3-D image, the 3-D effect being created by reducing the strengths of cues which are responsible for the perception of flat images. It has however been found in practice that the 3-D effect provided by this apparatus is negligible, and that the image is blurred, is low in brightness and is therefore difficult to view.

It is therefore an object of the present invention to provide a stereoscopic unit overcoming at least one of the above noted problems.

With this in mind, there is provided a stereoscopic display unit including at least two projection units for projecting optical signals corresponding to the left and right image fields respectively of a stereoscopic image, and an optical focusing system for focusing the two image fields to at least two focus regions at a viewing position outside the display unit, the left and right image fields each being respectively focused into the respective eyes of at least one viewer when located at said viewing position, wherein the optical focusing system includes at least one retroreflective mirror and a semi-reflective mirror disposed at an angle to the at least one retroreflective mirror, the semi-reflective mirror being partially reflective and partially transmissive, the optical signal being reflected between the at least one retroreflective mirror and the semi-reflective mirror and to said viewing position.

The display unit of the present invention leads to a 3-D image of greater brightness, absence of flicker and tolerance of viewer movement.

At least a portion of the optical signals are preferably reflected from the semi-reflective mirror onto the retroreflective mirror, the optical signals being subsequently reflected from the retroreflective mirror and through the semi-reflective mirror to the viewing position.

The display unit preferably includes a tracking system for determining the spatial position of the head or the eyes of the or each viewer. The projectors are preferably mounted on a carriage for varying the position of the projectors relative to an x-axis of movement. The adjustment of the position of the projectors relative to said x-axis is preferably controlled by said tracking system, the relative position thereof effecting tracking of the movement of the or each viewer in a direction parallel to said x-axis. In a preferred arrangement, the semi-reflective mirror is pivoted about an axis parallel to the said x-axis. This allows control of the angle between the semi-reflective mirror and the retroreflective mirror. This adjustment of the angular position of the semi-reflective mirror is controlled by the tracking system, the relative angular position thereof effecting tracking of the movement the or each viewer in a direction parallel to a y-axis of the movement thereof, said y-axis of movement being normal to said x-axis of movement.

In another preferred embodiment of the invention, a second said retroreflective mirror is preferably provided, wherein at least a portion of the optical signals passing through the semi-reflective mirror are reflected from the second retroreflective mirror, the optical signals being subsequently reflected from the semi-reflective mirror to the viewing position.

The display unit preferably includes at least two said projector units, the projector units being mounted so that the optical axis of the optical signals projected therefrom are at least substantially parallel. In an alternative preferred arrangement, the projector units are mounted so that the optical axis of each of the optical signals projected therefrom are initially at least substantially 90° relative to each other. A fully reflective mirror is positioned at least substantially 45° relative to the optical signals of one of the projector units to direct said optical signal along a path so that its optical axis is at least substantially parallel with the optical axis of the optical signal from the other projector unit to the semi-reflective mirror. The optical axis of the optical signals of each said projector unit may be spaced apart a distance at least substantially equal to the distance between the eyes of the or each viewer. Each projector unit may include a rectangular projection lens, the projector units thereby producing an elongate focus pattern.

In another alternative preferred arrangement including two projector units, a movably supported fully reflective tracking mirror is positioned to selectively intersect the optical axis of the optical signal projected from each projector unit, and a projection lens arrangement upon which the optical signal from both said projectors is included. The two projector units are mounted so that the optical axis of the optical signal from each projector unit is initially at least substantially 90° relative to each other, the tracking mirror being positioned at least substantially 45° relative to the optical axis of the optical signals projected from each of the projector units for selectively reflecting the optical signal of the first of said projector units along a path such that its optical axis is at least substantially parallel with the optical axis of the optical signal of the second of said projector units. The tracking mirror selectively blocks at least a portion of the optical signal of the second projector unit and/or selectively reflects at least a portion of the optical signal from the first projector unit, the movement of the tracking mirror being controlled by the tracking system. The overall optical signal projected by the projection lens arrangement is directed to the semi-reflective mirror.

In a further alternative preferred arrangement including two projection units, a segmented mirror having a plurality of fully reflective segments separated by fully transmissive segments, a projection lens arrangement upon which the optical signal from each said projector unit is projected, and a shutter unit including a plurality of selectively opaque shutters are provided. The shutter unit is supported parallel to and immediately adjacent the projection lens arrangement, the segmented mirror and shutter unit being positioned to intersect the optical signal projected from each projector unit. The two projector units are mounted so that the optical axis of the optical signal from each projector unit is initially at least substantially 90° relative to each other. The segmented mirror is positioned 45° relative to the optical axis of the optical signals projected from each of the projector units, the fully transmissive segments of the segmented mirror allowing the optical signal projected from the first of said projector units to pass therethrough, the fully reflective segments of the segmented mirror reflecting the optical signal projected from the second of said projector units along a path such that its optical axis is at least substantially the optical signal projected from the first projector unit. The overall signal projected by the projection lens arrangement is directed to the semi-reflective mirror, the shutter unit selectively blocking the optical signal reflected or transmitted from each mirror segment so that each eye of the or each viewer only respectively views one of the image fields, the shutter unit being controlled by the tracking system.

In the above preferred arrangement, the fully reflective mirror segments and the fully transmissive segments are preferably trapezoidal in shape and may be separated by non-reflective opaque regions. Furthermore, an opaque strip is preferably provided between each of the adjacent shutters. The projection lens arrangement used in the above preferred arrangement may preferably be formed by a plurality of at least substantially rectangular lens segments, all the segments having the same optical axis, the lens segments being positioned adjacent to one another along their longitudinal edges to form the lens arrangement.

In the above noted preferred arrangement, the optical signals projected from the projector units may be directed to the semi-reflective mirror by first and second fully reflective mirrors, the mirrors being positioned at an angle at least substantially 90° relative to each other. A hood extending over the optical focusing system may also be provided to prevent external reflections affecting the image.

A projection unit focus control means is preferably provided for controlling the focus of the projector units to thereby vary an effective focal plane of the projected stereoscopic image. This helps to maintain the 3-D effect in situations of high stereo disparity as are encountered with a large 3-D depth of field.

It will be convenient to further describe the invention by reference to the accompanying drawings which illustrate possible embodiments of the invention. Other embodiments of the invention are possible and consequently the particularity of the accompanying drawings is not to be understood as superseding the generality of the preceding description of the invention.

The stereoscopic display unit of the present invention is described herein with reference to one viewer only. It is to be appreciated that the display unit can be adapted to allow viewing by more than one viewer at any one time, and the present invention is therefore not restricted to viewing by only one person.

Figure 1:
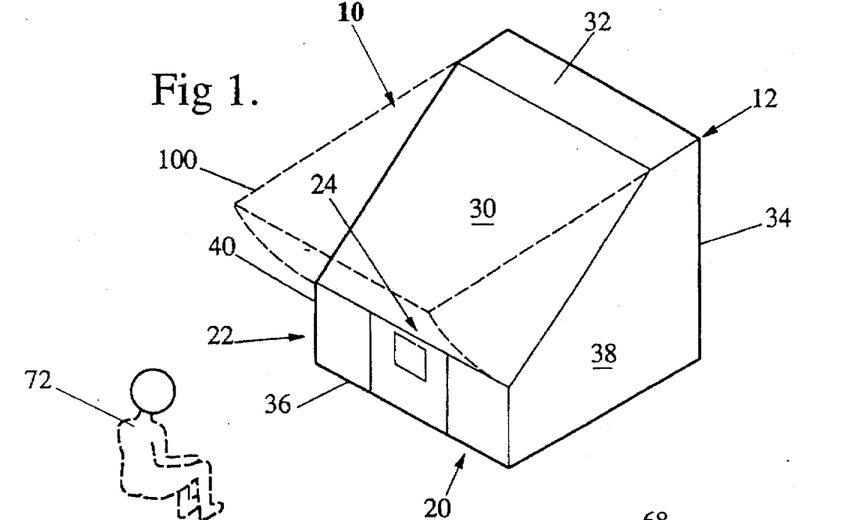
FIG. 1 is a perspective view, seen from above, of a first embodiment of a stereoscopic display unit according to the present invention shown in relation to a viewer.
Figure 2:
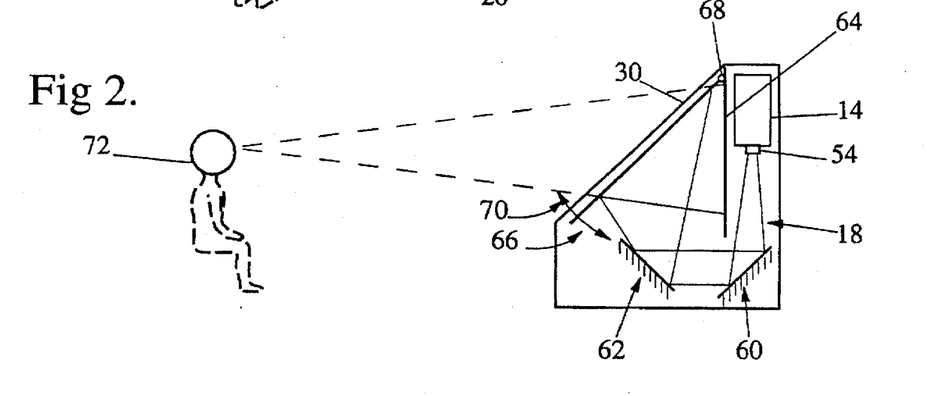
FIG. 2 is a schematic side view of the stereoscopic display unit of FIG. 1 showing image focusing paths.
Figure 3:
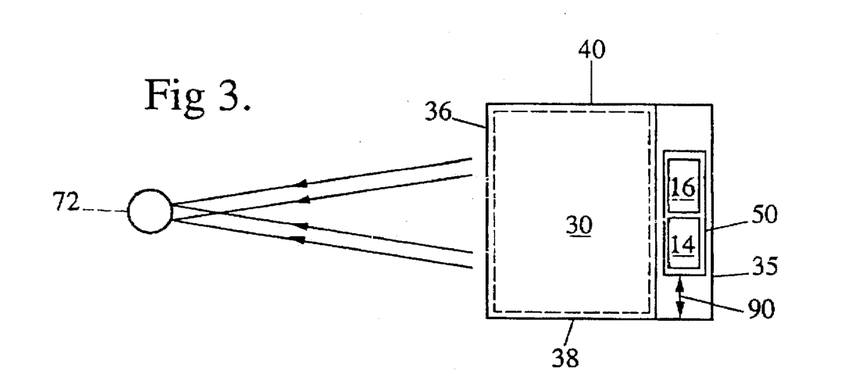
FIG. 3 is a plan view of the stereoscopic display unit of FIG. 1 showing focusing of left and right image fields.

In FIGS. 1 to 3 there is shown a first embodiment of a stereoscopic display unit 10 comprising a cabinet 12, two video projectors 14 and 16, an optical focusing unit 18, two audio speakers 20 and 22, an eye tracking module 24. The eye tracking module 24 determines the spatial position of the viewer's eyes either directly or through implication by determining the spatial position of the viewer's head.

The cabinet 12 has a front window 30 disposed at an angle of approximately 45° to the vertical. The front window 30 is substantially transparent. The cabinet 12 is substantially box shaped with one of its upper most horizontal edges chamfered off in the vicinity of the front window 30. The cabinet 12 thus has a top 32, a back 34, a front 36, and two sides 38 and 40.

The speakers 20 and 22 and the eye tracking module 24 are located in the front 36 of the cabinet 12. The speaker 20 is located proximate the side 38 and the speaker 22 proximate the side 40. The eye tracking module 24 is typically located between the speakers 20 and 22.

The video projectors 14 and 16 are mounted on a carriage 50 and are typically located within the cabinet 12 proximate the top 32 and the back 34. The projectors 14 and 16 are thus oriented with their projection lenses 54 directed downwardly.

The optical focusing system 18 comprises a retroreflective mirror 64 and a semi-reflective mirror 66. The first and second mirrors 60 and 62 are conventional fully reflective planar mirrors. The first mirror 60 is disposed at about 45° to an optical signal projected by the video projectors 14 and 16. The second mirror 62 is disposed at about 90° to the first mirror 60. For maximum efficiency the semi-reflective mirror 66 is about 50% reflective and about 50% transmissive. The retroreflective mirror 64 is in the exemplary embodiment disposed substantially parallel to the optical signals projected by the video projectors 14 and 16. The semi-reflective mirror 66 is disposed at an angle of approximately 45° to the retroreflective mirror. The semi-reflective mirror 66 has a hinge 68 at its upper edge for allowing variation of the angle of the semi-reflective mirror 66 with respect to the retroreflective mirror 64 as indicated by arrow 70. Optical signals projected by the video projectors 14 and 16 are reflected by the first mirror 60 to the second mirror 62 and thereby to the semi-reflective mirror 66 whereat the optical signal is reflected rearwardly onto the retroreflective mirror 64. The retroreflective mirror 64 has the effect of reflecting incident optical signals 180° to the angle of incidence. Hence, the retroreflective mirror 64 acts substantially as a spherically curved mirror in relation to all optical signals received by the semi-reflective mirror 66. The retroreflective mirror 64 then focuses the optical signals towards a viewer 72. The retroreflective mirror 64 and the semi-reflective mirror 66 constitute the optical focusing system of the present invention. As shown in FIG. 3, the optical signal of the video projector 14 is focused into the right eye of the viewer 72 and constitutes a right image field, whilst the video projector 16 transmits an optical signal which is focused into the left eye of the viewer 72 and constitutes a left image field. Hence, stereoscopic signals applied to the video projectors 14 and 16 provide a 3-D video image to the viewer 72.

Figure 4A:
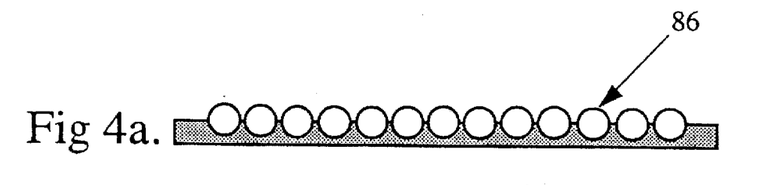
FIGS. 4a to 4c show various designs of a retroreflective mirror for the stereoscopic display unit of FIG. 2.
Figure 4B:
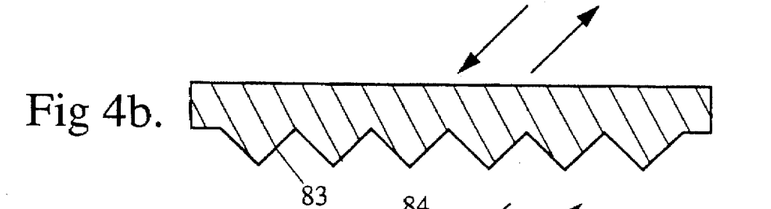
Figure 4C:
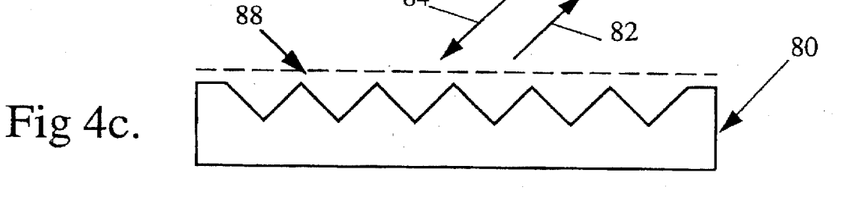

Preferably, the retroreflective mirror 64 has a surface with a metallised substrate 80 as shown in FIG. 4c. The metallised substrate 80 has a surface consisting of groups of faceted mirror surfaces oriented substantially at 90° to each other (i.e. corner cubes) and hence an incident optical signal 82 results in a reflected optical signal 84 which is substantially at 180° to the incident optical signal 82. The retroreflective mirror 64 differs from conventional spherically curved mirrors in that practically all rays of light incident upon it return to exactly the same spatial position that they originated from. Hence, image reversal does not occur. The effective focal distance of the retroreflective mirror 64 is equal to the length of the optical path from the video projectors 14 and 16 to the retroreflective mirror 64. The retroreflective mirror 64 has a magnification of 1.0 and generates practically no image distortion.

Alternative constructions for the retroreflective mirror 64 are shown in FIGS. 4a and 4b, however the metallised substrate 80 shown in FIG. 4c is preferred. FIG. 4a shows a plurality of glass beads 86 arranged in a matrix. The drawback of the glass beads 86 is that scattering of the incident light occurs at the interstices of the beads. This results in crosstalk between the left and right image fields. In FIG. 4b there is shown an alternative embodiment using a prismatic corner cube 83 type reflective surface. The disadvantage of the prismatic corner cube 83 is that optical attenuation occurs in the prismatic corner cube 83 and that refraction and light scattering is generated.

The eye tracking module 24 is designed to locate the eyes of the viewer 72 and to control the angle of the semi-reflective mirror 66 and the horizontal location of the video projectors 14 and 16 (via the carriage 50) so as to project the optical signal into the eyes of the viewer 72.

In use, a single video signal is sent to a digital video processor within the display unit 10, the processor generating two separate video signals. One of the video signals is applied to the video projector 14 and the other optical signal is applied to the video projector 16. The projectors project their optical signals through the projection lenses 54 onto the first mirror 60 which reflects the signal in diverging form to the second mirror 62 which reflects the signal in diverging form onto the partially reflective mirror 66 which reflects the optical signal in diverging form onto the retroreflective mirror 64. The retroreflective mirror 64 by virtue of its metallised substrate 80 reflects the incident optical signal through the semi-reflective mirror 66, through the front window 30 and to a focal point in the vicinity of the viewer 72. The optical signal from the video projector 14 is directed to the right eye of the viewer 72 and the optical signal from the video projector 16 is focused into the left eye of the viewer.

The size of the projected image field from each projector at the focal point is substantially equal to the dimensions of the projector lens 54. To ensure that the optical signals are directed to the desired focal point, the eye tracking module 24 locates the eyes of the viewer 72 and adjusts the angle of the semi-reflective mirror 66 to alter the point of focus of the optical signals in the vertical plane, thus allowing for movement and differences in height of viewers 72. Furthermore, the eye tracking module 24 also controls the carriage 50 for moving the video projectors 14 and 16 in the direction of the arrow 90, i.e. between the sides 38 and 40 for altering the focus point of the optical signals in the horizontal plane. The point of focus of the optical signals is at a distance away from the display unit 10 which distance is equal to the optical path length from the projection lens 54 to the retroreflective mirror 64.

Figure 5:
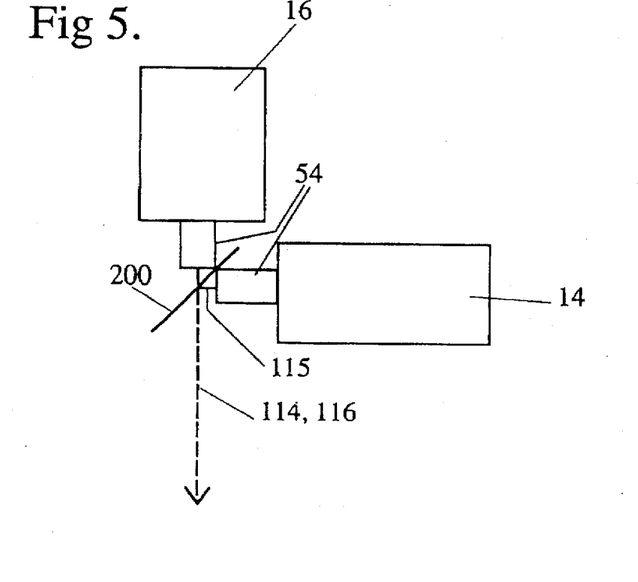
FIG. 5 is a schematic view showing an alternative arrangement for the projectors for the stereoscopic display unit of FIG. 2.

The lenses 54 of the projectors 14 and 16 should preferably be spaced apart a distance substantially corresponding to the distance between the viewer's eyes, typically about 65 mm, to thereby ensure that the optical axis of the optical signals projected from each projector are also at least substantially spaced apart the same distance. However, because of the physical size of the projectors 14 and 16, it may not be possible to so position the lenses 54. One way of reducing the distance between the optical axes of the optical signals is by using a parallax reducer assembly, which is a mirror arrangement located in the path of and thereby reflecting the two optical signals along a path which reduces the spacing therebetween. Such assemblies can however produce distortions and can lead to a certain loss of light intensity in the projected image fields. In addition, it is not possible to readily adjust the spacing of the optical signals in the above arrangement. Therefore, in an alternative embodiment of the invention as shown in FIG. 5, one projector 14 is mounted horizontally while the other projector 16 is mounted vertically so that the optical axis 115 of the optical signal from the horizontal projector 14 projects at least substantially 90° relative to the optical axis 116 of the optical signal from the vertical projector 16. A conventional fully reflective planar mirror 200 is provided in the path of the optical signal from the horizontal projector 14. In the view shown in FIG. 5, the vertical projector 16 is displaced either behind or in front of the horizontal projector 14 so that the optical axis 116 of the optical signal projected from the vertical projector 16 bypasses the planar mirror 200. This mirror however reflects the optical signal of the horizontal projector 14 along a path such that its optical axis 114 is parallel with the optical axis 116 of the optical signal from the vertical projector 16. The optical signals from projectors 14 and 16 extend, through a substantially common optical axis, through the mirror assembly comprising elements 60, 62, 66 of FIG. 2, until they strike the retroflective mirror 64, preferably converging to an identical spatial position. The spacing between the optical signals can therefore be readily set to correspond to the viewer's eye spacing. The spacing between the optical axes of the optical signals can then be simply varied by relative movement of the projectors 14, 16.

Because of the disposition of the semi-reflective mirror 66 external reflections may be directed into the eyes of the viewer adversely affecting the image clarity. One way of eliminating these reflections is by means of a hood 100, shown in phantom lines in FIG. 1, extending over and on either side of the front window 30 thereby shielding the semi-reflective mirror 66 from the ceiling. This hood 100 may be pivotally connected to the cabinet 12 so that it can function as a lid covering the front window 30 when the display unit 10 is not being used. It is also envisaged that the hood 100 be an integral part of an enclosure containing the components of the display unit.

Figure 6:
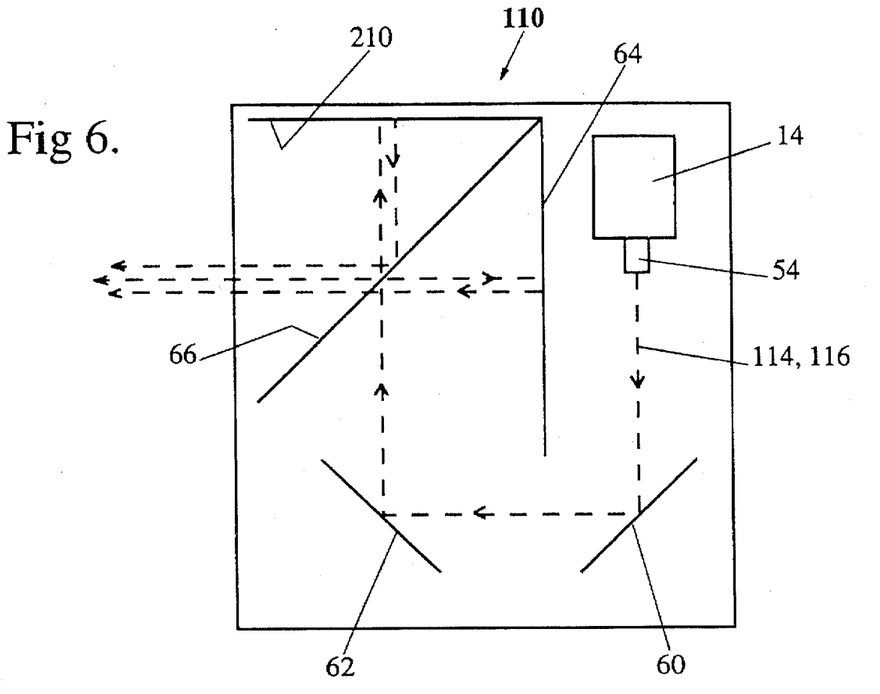
FIG. 6 is a schematic side view of an alternative embodiment of a stereoscopic display unit according to the present invention showing image focusing paths.

An alternative embodiment of the stereoscopic display unit of the present invention is shown in FIG. 6, this display unit 110 including a second retroreflective mirror 210 positioned at an angle approximately 90° to the first retroreflective mirror 64 and above the semi-reflective mirror 66. As well as shielding the optical focusing system from outside reflections, this arrangement provides a brighter stereoscopic image. In the embodiment of FIGS. 1 to 3, the optical signals which pass vertically through the semi-reflective mirror 66 are lost from the display unit 10. However, in the alternative embodiment of FIG. 6, which shows the optical axes 114, 116 of the optical signals reflected within the display unit 110 these optical signals are reflected back by the second retroreflective mirror 210 to the semi-reflective mirror 66 and then reflected towards the viewer as shown by the change in direction of the optical axes 114, 116 at the semi-reflective mirror 66. This therefore provides increased apparent brightness of the stereoscopic image for the viewer because of reduced light loss.

To avoid distortion of the images in this arrangement, the semi-reflective mirror 66 must be positioned so that it is always angled 45° relative to each of the retroreflective mirrors 64 and 210. It is therefore not possible to pivot the semi-reflective mirror 66 to provide vertical tracking without also adjusting the angles of the retroreflective mirrors 64 and 210 correspondingly. A simpler alternative is to provide projectors 14 and 16 with special elongate rectangular projector lenses. As noted above, the size of each of the projected image fields at the focal point is substantially the same size as the projection lens of the associated projector. Therefore, each projector having such a rectangular projection lens will result in an at least substantially vertical rectangular pattern of focused light, with the vertical height of this image being sufficient to ensure that viewers can still generally view the image without the need for vertical tracking of the viewer's eyes.

Figure 7:
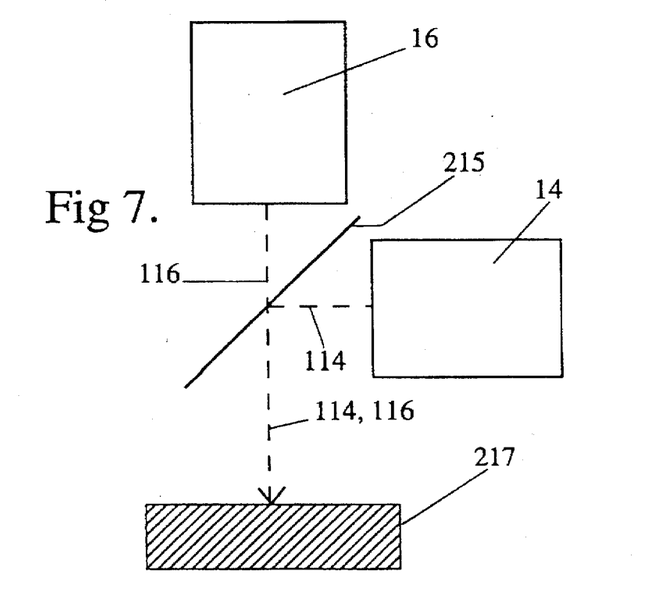
FIG. 7 is a schematic view of an alternative tracking arrangement.

The horizontal tracking, as described above, is accomplished by moving the projectors 14 and 16 horizontally by means of the carriage 50. However, such mechanical tracking is noisy, slow and there are inherent mechanical wear problems. It is therefore preferable to eliminate the need for the carriage 50 for horizontal tracking purposes. Therefore, in another arrangement for the projectors as shown in FIG. 7, the two projectors are mounted in a set position, one vertically and one horizontally. The projectors 14 and 16 do not have any projection lenses, the projectors each projecting their optical signal directly onto a projection lens arrangement 217 which is mounted horizontally and which may be formed by one or more lens elements. In the view shown in FIG. 7, the vertical projector 16 is mounted in the same plane as the horizontal projector 14 so that the optical axis 116 of the optical signal projected from the vertical projector 16 is aligned with and co-axial with the optical axis 114 of the horizontal projector 14.

A tracking mirror 215 which is a conventional fully reflective mirror is mounted at about 45° relative to the optical axes of the optical signals from each projector, the tracking mirror 215 being movable along a straight path (i.e. into and out of the page when viewed as shown in FIG. 7) which intersects the optical signal from both projectors 14 and 16. In the arrangement shown in FIG. 7, the vertical projector 16 projects one of the stereoscopic images directly onto the upper face of the projection lens arrangement 217, the horizontal projector 14 projecting the other corresponding stereoscopic image onto the same upper face of the projection lens arrangement 217, the latter image being reflected by the tracking mirror 215 to the lenses 217. The overall optical signal projected from the projection lens arrangement 217 therefore includes both stereoscopic images therein. This overall optical signal can therefore be focused by the optical focusing system 18 to the viewing position with the focused pattern being split into left and right image fields. The projection lens arrangement 217 is sufficiently sized to produce a projected image large enough to accommodate any reasonable movement of the eyes of the viewer thereby eliminating the need for both pivotal movement of the semi-reflective mirror 66 and horizontal movement of the projectors 14 and 16.

The eye tracking module 24 will track the viewer's eyes to ensure that the split between the two image fields on the projection lens arrangement 217 is positioned between the two eyes of the viewer to thereby maintain the 3-D effect. The position of the projected split is controlled by movement of the tracking mirror 215 which can partially block the optical signal of the vertical projector 16 or can reduce the amount of surface of the tracking mirror 215 from which the optical signal from the horizontal projector 14 can be reflected. This results in horizontal movement of the split between the two projected image fields on the lens arrangement 217.

Figure 8:
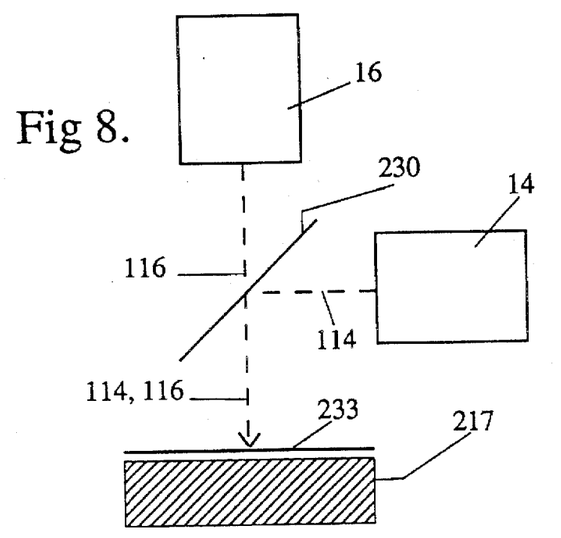
FIG. 8 is a schematic view of another alternative tracking arrangement.
Figure 9A:
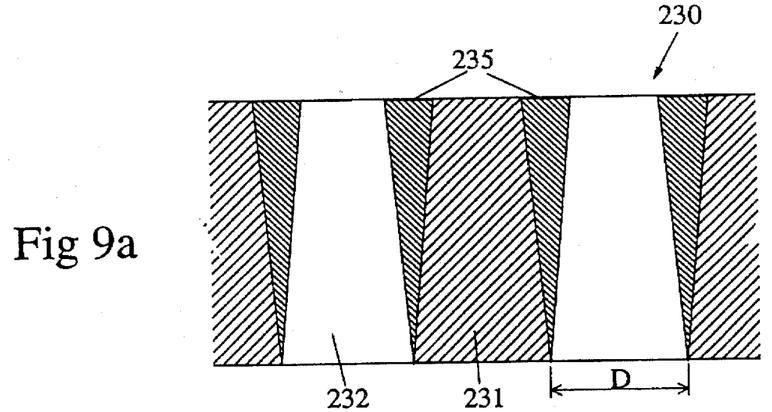
FIG. 9a is a partial schematic plan view of a segmented mirror for the tracking arrangement of FIG. 8.

In a related alternative embodiment of the tracking system of the invention, the tracking mirror 215 is replaced by a stationary segmented mirror 230 as shown in FIG. 8. A shutter unit 233 is placed adjacent and parallel to the upper face of the projection lens arrangement 217. The shutter unit described herein is of the Liquid Crystal Display type (LCD), although it should be appreciated that other types of electro-optical or electromechanical shutter units can alternatively be used. The segmented mirror 230 is preferably positioned 45° relative to the optical axis of the optical signal of each projector and intersects the optical axis of both optical paths. FIG. 9a is a partial view of the segmented mirror 230 showing that the mirror face is segmented into a plurality of strips comprising fully reflecting segments 231 and fully transmissive or transparent segments 232. The image projected by the vertical projector 16 (image A) can pass through the transparent segments 232 to the LCD shutter unit 233 whereas the image projected by the horizontal projector 14 (image B) is reflected from the reflecting segments 231 to the LCD shutter unit 233. Because the stationary segmented mirror is positioned 45° relative to the optical axes of the optical signals, the segments 231 and 232 are trapezoidal in shape to ensure that the image projected onto the LCD shutter unit 233 is at least substantially rectangular and not trapezoidal in shape. The narrower end of each trapezoidal segment is located at the upper edge of the segmented mirror 230. Narrow substantially triangular non-reflective opaque strips 235 are provided between each strip to define the edges of the segments. The average width "D" of each of the segments of the segmented mirror 230 is ideally an even fraction of the eye spacing, typically about one quarter the eye spacing of the viewer.

Figure 9B:
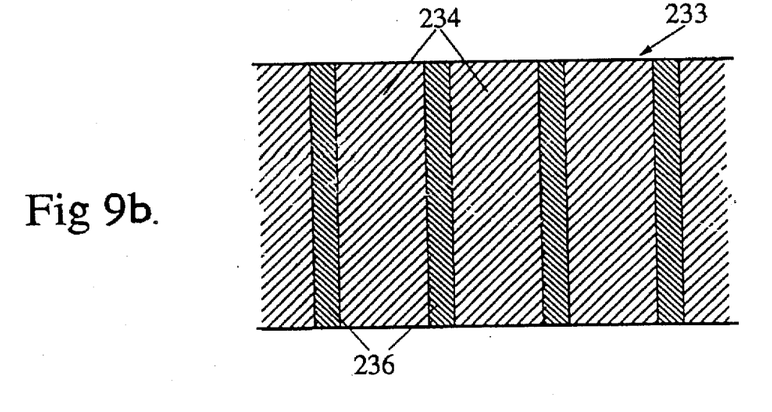
FIG. 9b is a partial schematic plan view of a LCD shutter unit for the tracking arrangement of FIG. 8.

FIG. 9b is a partial plan view of the LCD shutter unit 233 showing a plurality of at least substantially rectangular LCD shutters 234, the shutters 234 all being of the same width. A narrow opaque strip 236 is provided between each LCD shutter 234. Each of the LCD shutters 234 control the optical signal projected through a respective transparent segment 232 or the optical signal reflected from a respective reflecting segment 231 of the segmented mirror 230. The function of the opaque strips 236 is to eliminate blurred edges from adjacent projected segments from impinging upon the selected shutter segment. Each of the LCD shutters 234 can allow the image projected thereon to pass through the shutter unit 234 to the projection lens arrangement 217. However, when the LCD shutter 234 is actuated, it becomes opaque, blocking the transmission of the image projected thereon.

Depending on the position of the head of the viewer, one eye will see image A projected from a transparent segment 232, the other eye seeing image B reflected from a reflecting segment 231. The LCD shutter unit 233 is actuated to provide an opaque shutter to cover the segments on opposite sides of each of the segments seed by the viewer to ensure that there is no cross talk between the projected images A and B. Depending on which eye is viewing which segment, the images projected by the projectors can be reversed to ensure that the left eye only sees the left image, and the right eye only sees the right image.

The projection lens arrangement 217 can have single or multiple elements of glass or plastic. Alternatively, it is also envisaged that the projection lens arrangement 217 be formed by a plurality of at least substantially rectangular lens segments, all having the same optical axis, the lens elements being positioned adjacent to one another along their longitudinal edges to form the lens arrangement 217. The use of such a segmented lens arrangement 217 is possible because the optical signals only pass though certain segments of the lens arrangement 217 at any one time because of the shutter unit 233. Such a lens arrangement will be much less expensive to manufacture.

The projectors 14 and 16 can be of the Liquid Crystal Display (LCD) type wherein the image to be projected is formed on a colour LCD projection panel. The resolution and contrast of the projected image can however be improved by using three tube projectors wherein each tube projects a different colour component of the overall image, the colours combining to form the final image. It is not however possible to simply replace the LCD projectors with three tube projectors because the optical focusing system 18 will focus the three separate images from the projector tubes to a different viewing position because the optical signal from each tube is separately focused by the optical focusing system 18.

Figure 10:
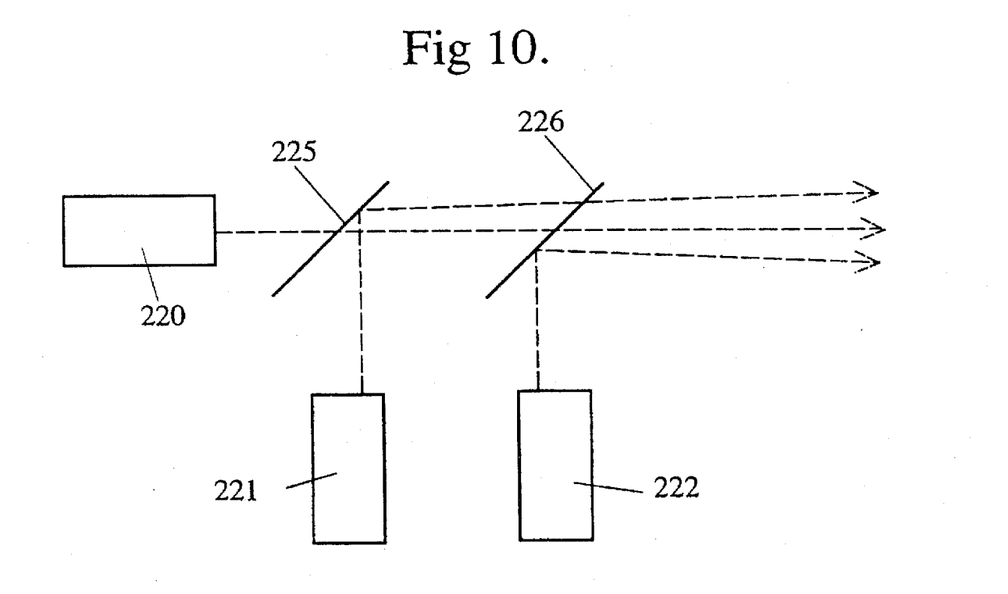
FIG. 10 is a schematic view of an alternative projector arrangement using a three tube projector.

To ensure that a single focus region is produced for each eye by the three tube projector, the tubes can be arranged as shown in FIG. 10. In an example arrangement, the blue projecting tube 220 projects an optical signal through a red reflecting dichroic mirror 225 and a green reflecting dichroic mirror 226. Dichroic mirrors are colour selective mirrors which reflect a particular band of spectral energy and transmits all others. A red projecting tube 221 is positioned adjacent to the red reflecting dichroic mirror 225 so that its optical signal is reflected off that mirror 225 and along the same path as the optical signal from the blue projecting tube 220. Similarly, the optical signal from a green projecting tube 222 is reflected off the green reflecting dichroic mirror 226 and along the same path as the above noted optical signals. The displacement of tube 222 in FIG. 10 is present to make equal the optical path length of all the three tubes. This produces a single multi coloured image which can be focused by the optical focusing system 18. This is only an example arrangement because the position of the tubes can be swapped around with corresponding changes to the dichroic mirrors. Alternatively, where some light loss is acceptable, semi-reflective mirrors could be used in place of dichroic mirrors. The lens of each tube is normally positioned in front of each tube. It is however also envisaged that these lenses be replaced with a single lens located forward of the last mirror 226. Finally, the use of other types of projector units other than those described above are also envisaged.

The two main physiological depth cues which provide people with a sense of three dimensionality are stereo disparity and focus. However 3-D systems can only provide stereo disparity information. The problem with 3-D systems in general is that when any imaginary object moves too close to the viewer, the 3-D effect is lost as the viewer can no longer physiologically accommodate the stereo disparity information provided by the 3-D system and the object "splits" into two images. This image splitting phenomenon occurs when the discrepancy between the focus depth cues and the stereo disparity depth cues are too great. This limitation can be substantially overcome if the focal plane of the projectors can be controlled, thereby bringing the two depth cues into convergence. The display unit 10, 110 of the present invention achieves this objective by controlling the focus of each projector unit. It has been found that, because of the behaviour of light reflected from a retroreflective mirror, the effective focal plane can be moved by defocusing to varying degrees the projectors. Therefore, it is possible to achieve a variable effective focal plane of projection by focus control of the projectors 14 and 16. It is envisaged that details of the "average distance" of the image being displayed can be encoded together with the input signal to the digital video processor and a projector unit focus control can be provided to control the focus of the projectors 14 and 16 during play back of the stereoscopic images.

The stereoscopic display unit 10 of the present invention has the advantage that the optical performance of the display unit 10 is not compromised by movements of the viewer (within a predetermined window of viewability). Secondly, that the optical efficiency of the display unit 10 is much higher than existing stereoscopic systems, thus making larger screen sizes possible and improving the contrast of the display in situations of high ambient light. Also, by the use of the retroreflective mirror 64 a near perfect spherical mirror can be simulated relatively inexpensively. Also, the accuracy of the element of the retroreflective metallised substrate 80 is not critical to the accuracy with which the retroreflective mirror 64 simulates a spherical mirror.

Modifications and variations such as would be apparent to a skilled addressee are considered within the scope of the present invention as defined by the appended claims.

I claim:

1. A stereoscopic display unit including two projection units for projecting optical signals corresponding to the left and right image fields respectively of a stereoscopic image, and an optical focusing system for focusing the two image fields to at least two focus regions at a viewing position outside the display unit, the left and right image fields each being respectively focused into the respective eyes of at least one viewer when located at said viewing position, wherein the optical focusing system includes at least one retroreflective mirror and a semi-reflective mirror disposed at an angle to the at least one retroreflective mirror, the semi-reflective mirror being partially reflective and partially transmissive, the optical signal being reflected between the at least one retroreflective mirror and the semi-reflective mirror and to said viewing position, the optical signals projected from the projection units being directed to the semi-reflective mirror by first and second fully reflective mirrors which are positioned at an angle at least substantially 90° relative to each other.

2. A stereoscopic display unit including:
   two projection units for projecting optical signals corresponding to the left and right image fields respectively of a stereoscopic image;
   an optical focusing system for focusing the two image fields to at least two focus regions at a viewing position outside the display unit, the left and right image fields each being respectively focused into the respective eyes of at least one viewer when located at said viewing position, wherein the optical focusing system includes at least one retroreflective mirror and a semi-reflective mirror disposed at an angle to the at least one retroreflective mirror, the semi-reflective mirror being partially reflective and partially transmissive, the optical signal being reflected between the at least one retroreflective mirror and the semi-reflective mirror and to said viewing position; and a tracking system for determining the spatial position of the head or the eyes of the or each viewer.

3. A display unit as claimed in claim 2, wherein at least a portion of the optical signals are reflected from the semi-reflective mirror onto the retroreflective mirror, the optical signals being subsequently reflected from the retroreflective mirror and through the semi-reflective mirror to the viewing position.

4. A display unit as claimed in claim 1, wherein the projection units are mounted on a carriage for varying the position of the projection units relative to an X-axis of movement, the adjustment of the position of the projection units relative to said X-axis being controlled by said tracking system, the relative position thereof effecting tracking of the movement of the or each viewer in a direction substantially parallel to said X-axis.

5. A display unit as claimed in claim 4, wherein the semi-reflective mirror is pivoted about an axis parallel to the said x-axis, to allow control of the angle between the semi-reflective mirror and the at least one retroreflective mirror, the adjustment of the angular position of the semi-reflective mirror being controlled by said tracking system, the relative angular position thereof affecting tracking of the movement of the or each viewer in a direction parallel to a y-axis of the movement thereof, the said y-axis of movement being normal to said x-axis of movement.

6. A display unit as claimed in claim 1, including a second said retroreflective mirror, wherein at least a portion of the optical signals passing through the semi-reflective mirror are reflected from the second retroreflective mirror, the optical signals being subsequently reflected from the semi-reflective mirror to the viewing position.

7. A display unit as claimed in claim 1, wherein said projection units are mounted so that the optical axis of the optical signals projected therefrom are at least substantially parallel.

8. A display unit as claimed in claim 1, wherein said projection units are mounted so that the optical axis of each of the optical signals projected therefrom are initially projected at an angle of about 90° relative to each other, a fully reflective mirror positioned at an angle of about 45° relative to the optical signal of one of the projection units to direct said optical signal along a path so that its optical axis is at least substantially parallel with the optical axis of the optical signal from the other projection unit to the semi-reflective mirror, the optical axis of the optical signals of each said projection unit being spaced apart a distance at least substantially equal to the distance between the eyes of the or each viewer.

9. A display unit according to claim 4 wherein each projection unit includes a rectangular projection lens, the projection units thereby producing an elongate focus pattern.

10. A display unit according to claim 2 including a movably supported fully reflective tracking mirror positioned to selectively intersect the optical axis of the optical signal projected from each projection unit, a projection lens arrangement upon which the optical signal from both said projector units are projected, the two projection units being mounted so that the optical axis of the optical signal from each projection unit is initially at an angle of about 90° relative to each other, the tracking mirror being positioned at an angle of about 45° relative to the optical axis of the optical signals projected from each of the projection units for selectively reflecting the optical signal of the first of said projection units along a path such that its optical axis is at least substantially parallel with the optical axis of the optical signal of the second of said projection units, the tracking mirror selectively blocking at least a portion of the optical signal of the second projection unit, the movement of the tracking mirror being controlled by the tracking system, the overall optical signal projected by the projection lens arrangement being directed to the semi-reflective mirror.

11. A display unit according to claim 1 including a segmented mirror having a plurality of fully reflective segments separated by fully transmissive segments, a projection lens arrangement upon which the optical signal from each said projection unit is projected, a shutter unit including a plurality of selectively opaque shutters, the shutter unit being supported at least substantially parallel to and immediately adjacent the projection lens arrangement, the segmented mirror and shutter unit being positioned to intersect the optical signal projected from each projection unit, the two projection units being mounted so that the optical axis of the optical signal from each projection unit is initially projected at an angle of about 90° relative to each other, the segmented mirror being positioned at an angle of about 45° relative to the optical axis of the optical signals projected from each of the projection units, the fully transmissive segments of the segmented mirror allowing the optical signal projected from the first of said projector units to pass therethrough, the fully reflective segments of the segmented mirror reflecting the optical signal projected from the second of said projection units along a path such that its optical axis is at least substantially parallel with the optical axis of the optical signals projected from the first projection unit, the overall signal projected by the projection lens arrangement being directed to the semi-reflective mirror, the shutter unit selectively blocking the optical signal reflected or transmitted from each segment of the segmented mirror so that each eye of the or each viewer only respective views one of the image fields, the shutter unit being controlled by the tracking system.

12. A display unit according to claim 11 wherein the fully reflective mirror segments and the fully transmissive mirror segments are trapezoidal in shape and are separated by non-reflective opaque regions.

13. A display unit according to claim 11 wherein an opaque strip is provided between each of the adjacent shutters.

14. A display unit according to claim 10 wherein the projection lens arrangement is formed by a plurality of at least substantially rectangular lens segments, all the segments having the same the same optical axis, the lens segments being positioned adjacent to one another along their longitudinal edges to form the lens arrangement.

15. A display unit as claimed in claim 1 wherein the optical signals projected from the projection units are directed to the semi-reflective mirror by first and second fully reflective mirrors, the mirrors being positioned at an angle at least substantially 90° relative to each other.

16. A display unit according to claim 1 including a hood extending over the optical focusing system to prevent external reflections effecting the image.

17. A display unit according to claim 1 including projection unit focus control means for controlling the focus of the projection units to thereby vary an effective focal plane of the projected stereoscopic image.

18. A display unit according to claim 1 including a movably supported fully reflective tracking mirror positioned to selectively intersect the optical axis of the optical signal projected from each projection unit, a projection lens arrangement upon which the optical signal from both said projector units are projected, the two projection units being mounted so that the optical axis of the optical signal from each projection unit is initially at an angle of about 90° relative to each other, the tracking mirror being positioned at an angle of about 45° relative to the optical axis of the optical signals projected from each of the projection units for selectively reflecting the optical signal of the first of said projection units along a path such that its optical axis is at least substantially parallel with the optical axis of the optical signal of the second of said projection units, the tracking mirror selectively reflecting at least a portion of the optical signal from the first projection unit, the movement of the tracking mirror being controlled by the tracking system, the overall optical signal projected by the projection lens arrangement being directed to the semi-reflective mirror.

19. A display unit according to claim 18 wherein the projection lens arrangement is formed by a plurality of at least substantially rectangular lens segments, all the segments having the same the same optical axis, the lens segments being positioned adjacent to one another along their longitudinal edges to form the lens arrangement.

20. A stereoscopic display unit including two projection units for projecting optical signals corresponding to the left and right image fields respectively of a stereoscopic image, and an optical focusing system for focusing the two image fields to at least two focus regions at a viewing position outside the display unit, the left and right image fields each being respectively focused into the respective eyes of at least one viewer when located at said viewing position, wherein the optical focusing system includes first and second retroreflective mirrors and a semi-reflective mirror disposed at an angle to the first and second retroreflective mirrors, the semi-reflective mirror being partially reflective and partially transmissive, the optical signal being reflected between the first retroreflective mirror and the semi-reflective mirror and to said viewing position, at least a portion of the optical signals passing through the semi-reflective mirror being reflected from the second retroreflective mirror, the optical signals being subsequently reflected from the semi-reflective mirror to the viewing position.

* * * * *